W. H. COLDWELL.
LAWN MOWING AND SWEEPING MACHINE, &c.
APPLICATION FILED FEB. 1, 1915.
1,173,485.
Patented Feb. 29, 1916.
5 SHEETS—SHEET 2.
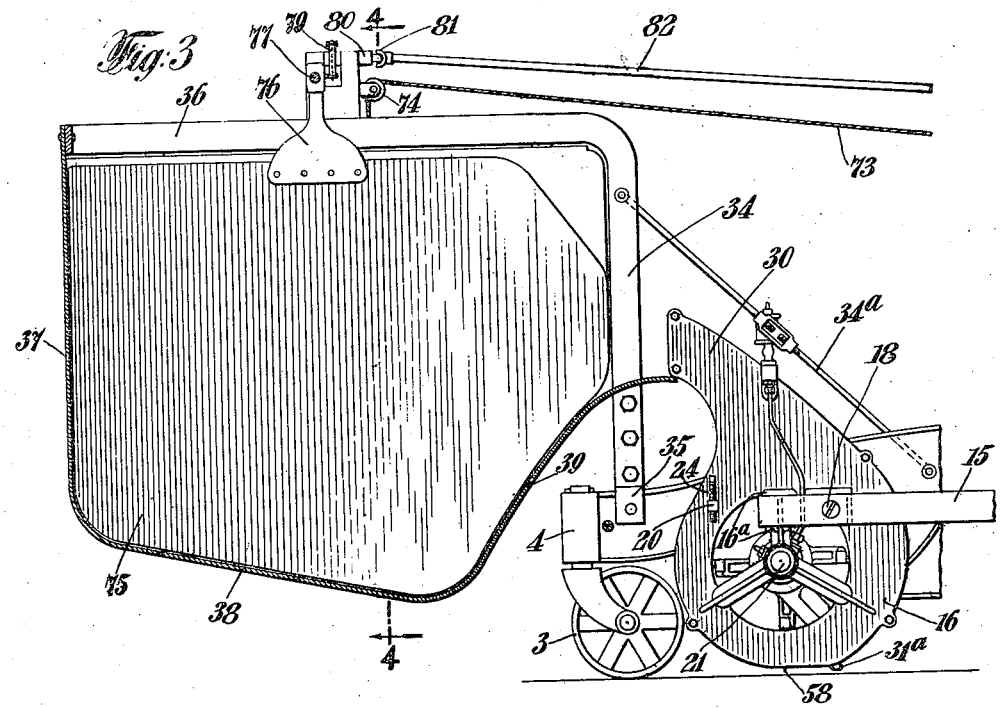
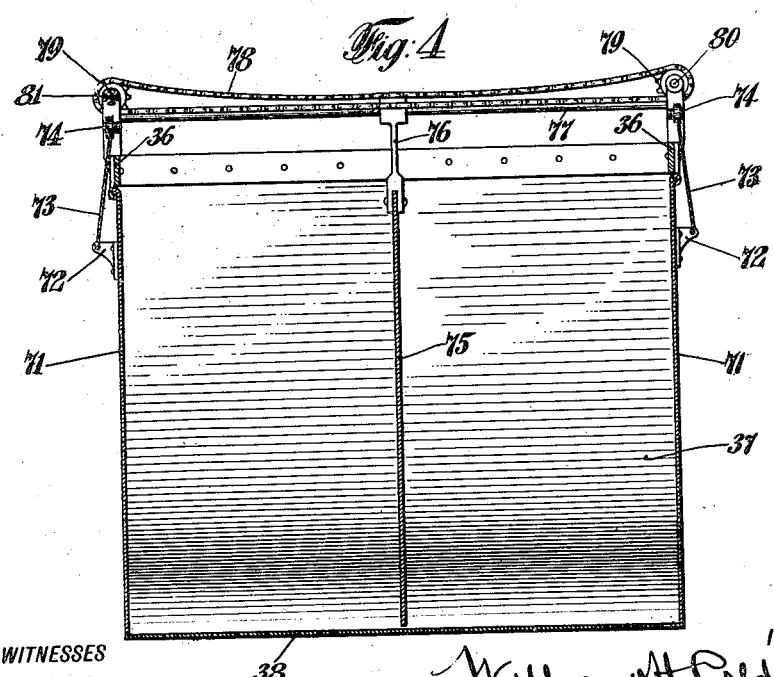

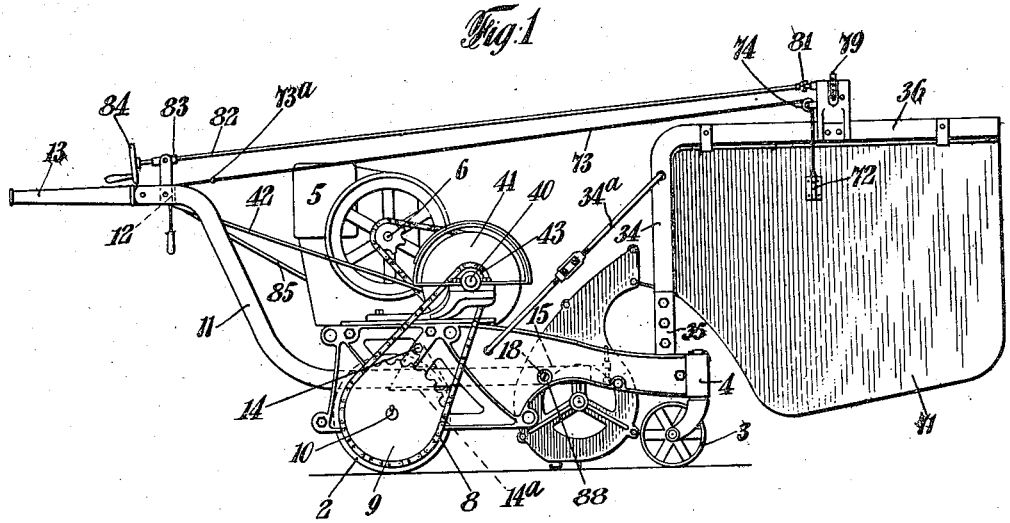

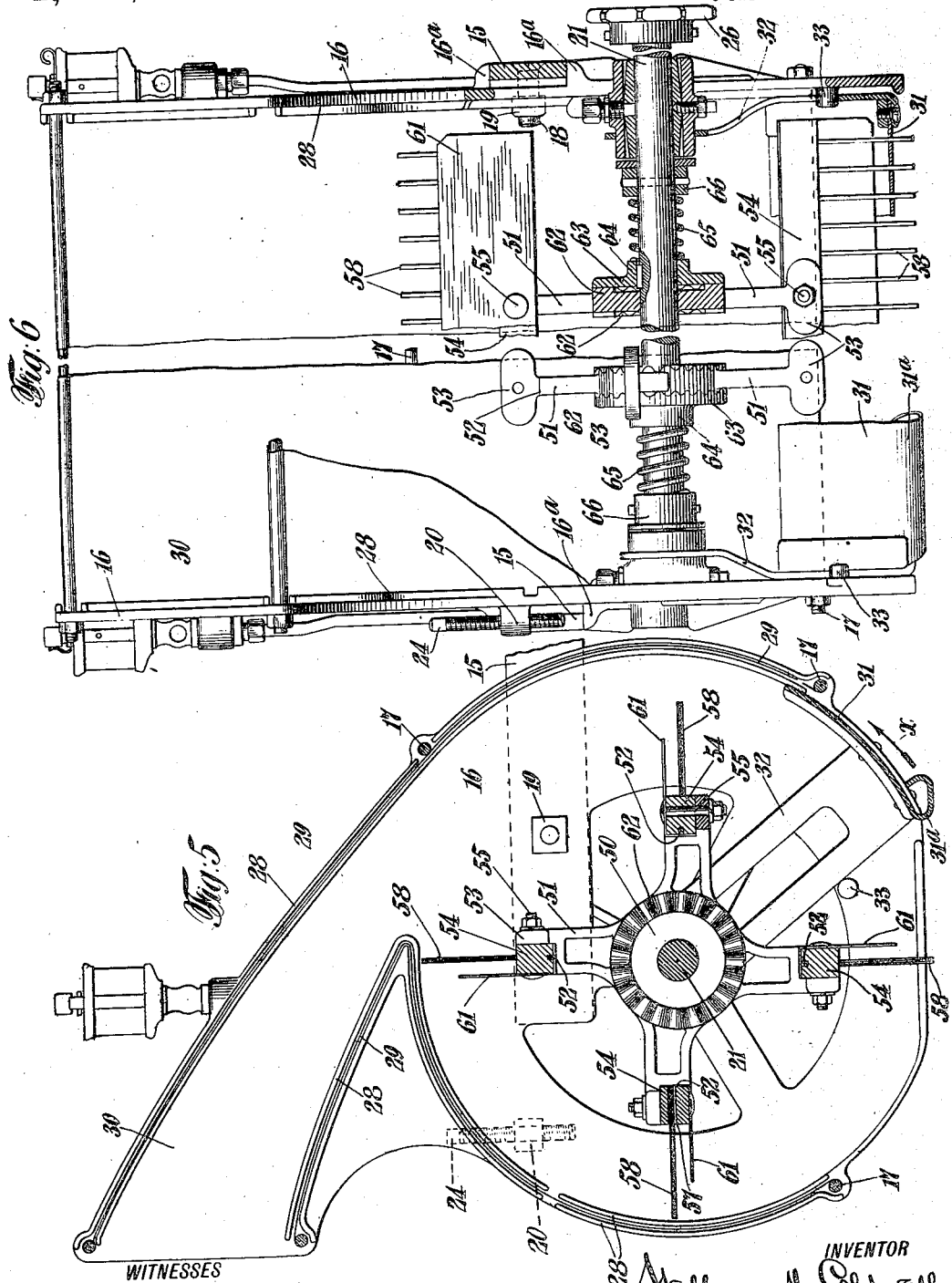

W. H. COLDWELL.
LAWN MOWING AND SWEEPING MACHINE, &c.
APPLICATION FILED FEB. 1, 1915.
1,173,485.
Patented Feb. 29, 1916.
5 SHEETS—SHEET 4.
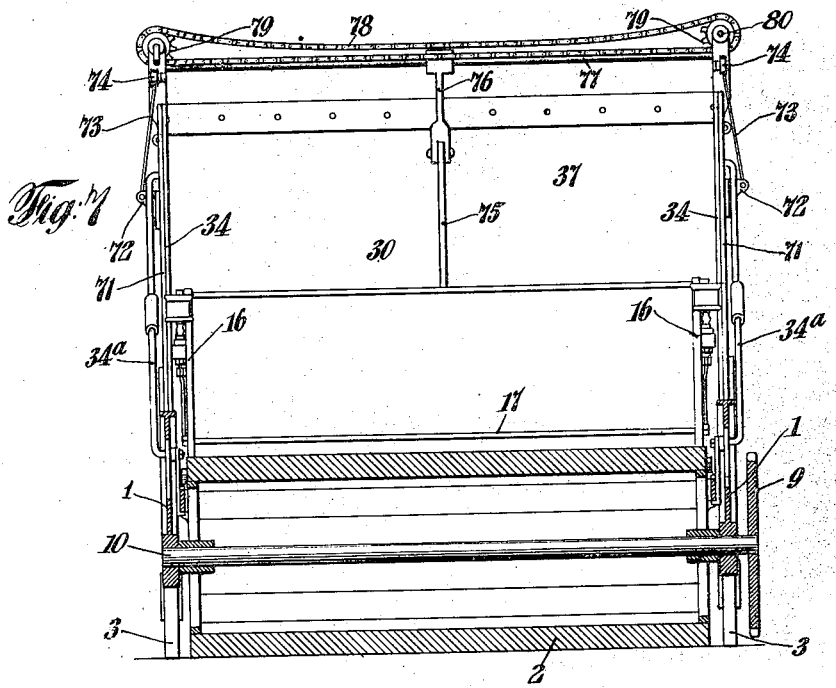
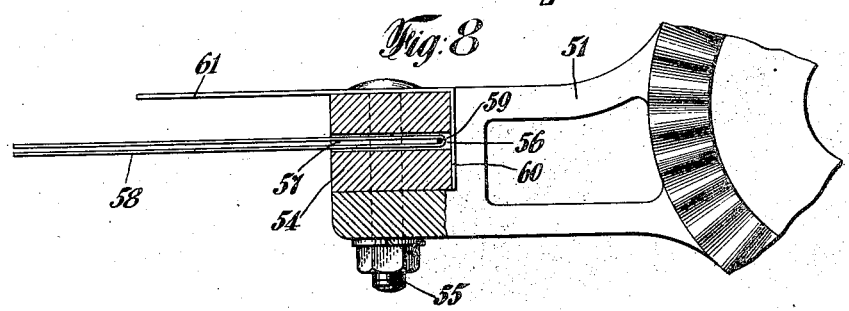
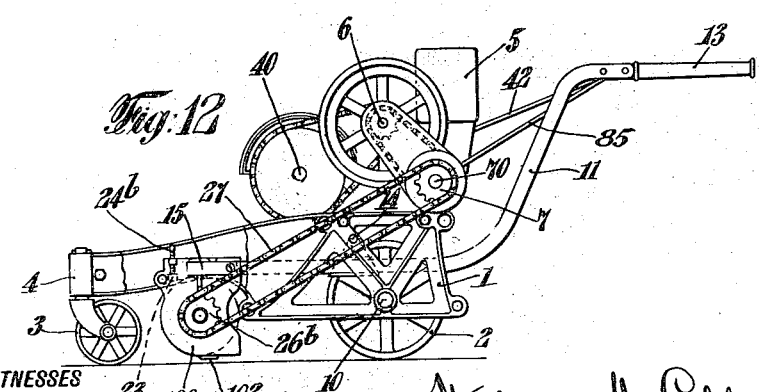
WITNESSES
John E. Prager
A. Worden Gibbs
INVENTOR
William H. Coldwell
BY
Whitaker Prevost
ATTORNEYS W. H. COLDWELL.
LAWN MOWING AND SWEEPING MACHINE, &c.
APPLICATION FILED FEB. 1, 1915.
1,173,485.
Patented Feb. 29, 1916.
5 SHEETS—SHEET 5.
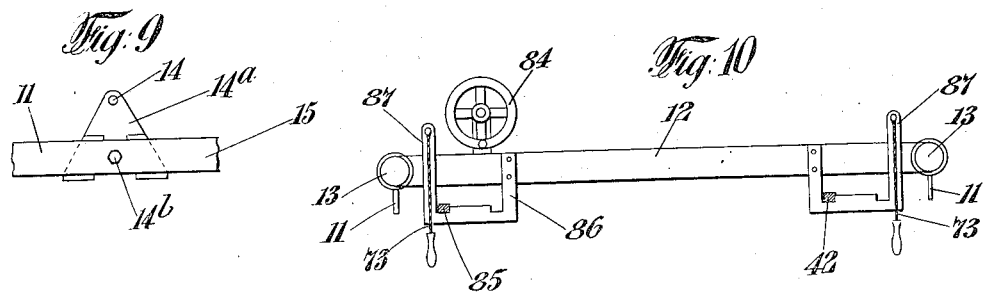
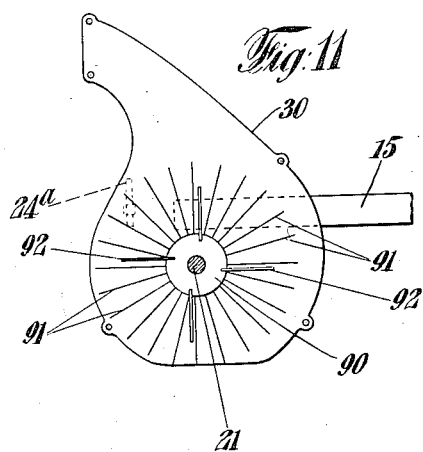
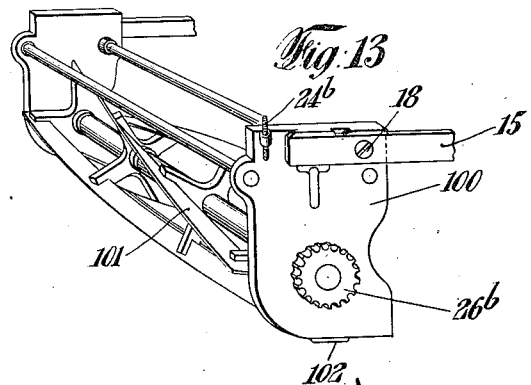
WITNESSES
John E. Prager
A. Worden Gibbs
INVENTOR
William H. Coldwell
BY
Whitaker Prevost ATTORNEYS

UNITED STATES PATENT OFFICE.

WILLIAM H. COLDWELL, OF NEWBURGH, NEW YORK.

LAWN MOWING AND SWEEPING MACHINE, &c.

1,173,485.

Specification of Letters Patent.  Patented Feb. 29, 1916.

Application filed February 1, 1915. Serial No. 5,393.

*To all whom it may concern:*

Be it known that I, WILLIAM H. COLDWELL, a citizen of the United States, residing at Newburgh, in the county of Orange and State of New York, have invented certain new and useful Improvements in Lawn Mowing and Sweeping Machines, &c.; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one embodiment of my invention selected by me for purposes of illustration, and the said invention is fully disclosed in the following description and claims.

Referring to the said drawings, Figure 1 represents a side elevation of a lawn rake or sweeper having my present invention embodied therein. Fig. 2 is a similar elevation showing the other side of the machine. Fig. 3 is an enlarged vertical longitudinal section of the front portion of the machine. Fig. 4 is a vertical transverse section through the collecting box of the machine on line 4—4 of Fig. 3 looking in the direction of the arrows. Fig. 5 is an enlarged vertical section taken longitudinally of the machine through the demountable rotary raking or sweeping unit. Fig. 6 is a partial front elevation of the raking and sweeping unit with the casing removed, the raking and sweeping device and fan blades being broken away and parts shown in section. Fig. 7 is a vertical section on line 7—7 of Fig. 2, looking in the direction of the arrows, the motor and connected parts being removed. Fig. 8 is an enlarged detail view of one of the rake or brush and fan units of the rotary raking and brushing device of the machine. Fig. 9 is a detail of one of the pivotal supports for the handle bars. Fig. 10 is a rear elevation of the handle bars and connecting rear cross bar, the gear control levers being shown in section. Fig. 11 is a detail view of a demountable unit provided with a rotary ground scarifying device which can be interchanged with the demountable rake or brush unit or the demountable cutter unit. Fig. 12 is a side elevation similar to Fig. 2 showing the machine converted into a motor lawn mower by removing the rotary raking and sweeping unit and substituting a demountable cutter unit therefor, the collecting box and connected parts being also removed from the machine. Fig. 13 is a detail view of the demountable cutter unit and adjacent portions of the handle bars to which it is detachably connected.

My invention relates primarily to a machine for raking or sweeping lawns for the removal therefrom of cut grass, dead grass, leaves, etc., which in its preferred form is so constructed as to be propelled by a prime motor, preferably of the internal combustion engine type and capable of being steered by the operator walking behind the machine and controlling the direction of the movement by means of suitable handles, the rotary brush or sweeper, and preferably the casing inclosing the same constituting a detachable unit which can be removed from the machine to permit the substitution therefor of a demountable cutter unit to enable the device, without other modification, to be used as a lawn mover and also to permit the substitution of a demountable unit provided with a rotary device for scarifying the sod to permit the application of a fertilizer or plant food or seed thereto.

My invention also comprehends the arrangement of the demountable unit in conjunction with the steering handle or handles in such manner that the operator may by depressing said handles, elevate the demountable unit from its normal position in the machine to permit it to pass over obstacles without interfering with the steering of the machine, and without raising any other part of the machine.

My invention also comprehends certain novel features of construction and combination of parts hereinafter fully described and particularly pointed out in the claims forming part of this specification. The entire machine or implement therein shown and described constitutes a peculiarly useful and desirable implement for the care and preservation of lawns especially on large estates, golf courses, parks, and the like, where large amounts of turf are to be cared for, in that one and the same machine provided with a plurality of demountable units, the lawn mower to cut during the summer months, and in the fall the demountable cutter unit can be removed and the demountable rake or sweeper unit substituted therefor, and the device used for raking and sweeping the lawns to free it from short cut grass, dead grass, and leaves, etc., while either in the fall or spring the demountable scarifying unit can be employed in the same machine for scarifying the ground, particularly where the sod is thin to facilitate the introduction of seed or fertilizer or both. As the substitution can be quickly made, the grass can also be cut with the machine using the demountable cutter unit, and the machine can thus be quickly altered by the substitution of the rake or sweeper unit with or without the collecting apparatus for the purpose of raking the grass.

In my former application, filed in the United States Patent Office on or about July 3, 1914, Serial No. 848,771, I have shown a somewhat similar machine provided only with a demountable cutter unit and connected with a pivotal handle bar or bars for steering the machine, and this construction I do not herein specifically claim.

In the accompanying drawings, I have shown one embodiment of my invention selected by me for the purpose of illustrating the same, and I will proceed to describe the same. With reference, first to the arrangement of the machine as a lawn rake or sweeper as illustrated in Figs. 1 to 10 inclusive, in these figures, 1 represents the main frame of the device comprising in this instance of lateral frame plates connected by suitable crossbars or braces supported at its rear end by traction lawn rolling rollers 2 and at its forward end, preferably by a pair of caster wheels 3, each having a vertically disposed pivotal connection 4, with the front portion of one of the side frames, in the usual manner. The traction rollers are provided with the usual differential gearing (not shown) and are operatively connected with a motor 5, which is preferably a gasolene internal combustion engine of any desired type. In this instance the shaft 6 of the engine or motor is connected by sprocket gearing with a driving shaft 40, suitable reversing mechanism indicated at 41 being provided for priming the shaft 40, to be driven in either direction. This reversing mechanism is shown inclosed in a casing and as it forms no part of the present invention, will not be further illustrated or described herein. It includes a reversing lever 42 extending to the rear of the machine where it is provided with a handle within the reach of the operator so that the driving shaft may be driven in either direction or permitted to stand still as desired. The driving shaft 40 is provided with a sprocket 43 connected by chain 8 with a sprocket wheel 9 on the shaft 10 of the traction and lawn rolling rollers 2, although any other suitable form of gearing may be substituted between the rollers and the motor 5 if desired. The machine frame 1 is provided with a pair of rearwardly extending handle bars 11—11 which are connected at the rear by the cross brace 12 or cross braces so that the two pairs move simultaneously, and said bars are provided at their rear extremities with hand engaging portions 13. Each of the said handle bars is pivoted to the main frame at 14, in this instance, I have shown each of the handle bars provided with a saddle plate 14$^a$ one of which is illustrated in detail in Fig. 9, provided with lugs to engage the handle and having an upwardly extending portion provided with an aperture to engage the pivot pin 14, the handle bar being secured to the saddle by a bolt 14$^b$. This construction permits the handle bar to be made straight at its lower portion and yet permit it to be pivoted at a higher point for a purpose hereinafter described. The forwardly extending portions 15 of the handle bars are provided with means for detachably connecting them with either one of the demountable units hereinafter referred to. In Figs. 1 to 10 the machine is shown arranged as a lawn rake or sweeper and therefore the forward ends of the handle bars carry, as shown, the demountable rake or sweeper unit, which will now be described.

The demountable rake or sweeper unit is perhaps best illustrated in Figs. 3, 5, and 6, and it comprises a pair of side plates or frames 16—16 suitably united and braced by transverse tie-rods 17—17 and a rotary rake or sweeper, the shaft 21 of which extends transversely of the machine is mounted in suitable bearings in the side plates 16. The construction of the rotary rake or sweeper which I prefer to employ is best illustrated in Figs. 5, 6, and 8. The shaft 21 is provided with a plurality of spiders each of which comprises a hub or collar 50 and projecting arms 51, said collar being loosely mounted on the shaft 21. Each of the said arms is provided with a shoulder 52, driving gear 53 extending beyond the same, disposed preferably perpendicularly thereof, the several shoulders and gears forming spiders or seats to receive transversely arranged tooth bars 54, which are preferably made of wood and are secured in position by bolts 55 (or screws) extending through said gears. I prefer to provide each spider with four arms, as shown, to receive four of the tooth bars, but any other desired number may be employed, each of the tooth bars, being provided, as shown, with a longitudinal groove or recess 56 at its inner face, that is to say, the face nearest the shaft 21, and is also provided with a plurality of apertures 57 extending transversely of the bar in a substantially radial direction (see Figs. 5 and 8) to receive the flexible and resilient raking or sweeping members. These are formed, preferably as shown in Fig. 8, by taking a straight piece of wire 58, ratan, or other suitable material, and bending it centrally and forcing the bent wire or other material in parallel relation through one of the apertures 57 so that the loop or bend will extend into the inner groove or recess 56, while the bifurcated portions project from the outer surface of the bar, as clearly shown in Fig. 8, and when all of the apertures 57 have been so provided with the raking or sweeping members, a locking rod or wire 59 is passed through the loops of all of said members within the groove 56, as shown in said figure, thereby preventing all of the sweeping members from being pulled upwardly. I also provide the inner face of the bar 54 with a plate 60 which closes the groove 56 and prevents any of the sweeping or raking members from being pushed inwardly. This plate 60 may be attached to the bar in any desired manner, but as it is desirable that the loose grass particles, leaves, etc., shall be discharged into a suitable receptacle. I prefer to provide each of the bars with a fan member which consists of a metal plate 61 extending from the bar outwardly a less distance than the length of the raking or sweeping members, and extending transversely of the device so as to form a fan blade on each of said bars and for convenience of assembling, I prefer to form the plate 60 integral with the fan member 61 by bending a portion of the metal of the fan blade at right angles thereof and the fan member or blade as well as the plate 60 is held in fixed relation to the bar 54, by means of the screws or bolts 55 which also connect the bar to the gears 53.

The construction just described forms a very advantageous raking or sweeping device and fan, in which it will be observed that the raking or sweeping members are of a very considerable length, and being formed of resilient material are capable of a wide range of yield in case they strike an obstacle or an immovable object, so that they are not likely to become broken as would be the case were they of material of less length. It will also be noticed that the fan member 61 or plate is placed on the forward side of the raking or sweeping members, so that it precedes them, and while the raking or sweeping members project far enough beyond the outer edge of the fan blade to enable them to pick up the grass, leaves, etc., the fan blade materially protects the raking or sweeping members from injury and at the same time is of such extent, that a strong current of air is created when the device is rotated. In order to further protect both the fan blade and the teeth or raking or sweeping members 58, I provide means for yieldingly connecting the sweeping or raking member with the shaft 21 so that if the rotary parts of the sweeping or raking members strike an obstacle, it may stop while the shaft continues to rotate, and thus prevent permanent injury to the device. In this instance the outer faces of the two exterior spiders are provided with an annular locking face 62 which is provided with a ribbed or undulating or serrated surface to engage a similarly shaped annular face of a longitudinally movable clutch plate 63 having a collar 64 splined or keyed on the shaft 21, but capable of longitudinal movement thereon, a coil spring 65 being interposed between said collar 64 and some part incapable of longitudinal movement with respect to the shaft, as the collar 66, pinned to the shaft as herein shown, so that the spring normally holds the clutch plate 63 in engagement with the adjacent spider and causes the raking or sweeping members to rotate with the shaft. I prefer to provide one of these clutch plates 63 and spring 65 at each end of the sweeping or raking members, although one would be sufficient and the serrations or undulations of the contact surfaces are of such character as to permit the shaft to rotate with respect to the sweeping or raking member, in case the latter encounters an obstacle which would be likely to damage the teeth or fan blades. For convenience in casting the spiders, they will ordinarily be made with the serrated surfaces 62 on each side of their collar portions so that all the castings will be alike and it will make no difference which pair are placed at the outer end of the rotary device, but this is not essential and only the outer faces of the exterior collars need have the serrated portions. The shaft 21 is driven from the motor 5 in any desired way, but I prefer to provide on the frame of the machine, an auxiliary driving shaft 70 connected by sprocket or other gearing with the driving shaft of the motor, as indicated in dotted lines in Fig. 2, said shaft 70 being provided with a sprocket 7 connected by sprocket chain 27 with a sprocket 26 on a shaft 21, for imparting rotary motion to the latter shaft. I also prefer to arrange the driving connections in such a manner that the elevation of the demountable unit with respect to the machine, as hereinafter described, will not interfere with the driving connections. In this instance the point of pivot 14 of the handle bars is substantially in a line between the centers of the shafts 70 and 21, so that the rise and fall of the demountable unit will not materially affect the driving chain 27, as will be readily understood.

The demountable unit heretofore described, is carried by the vertically extending portions 15 of the handle bars 11, and I prefer to provide each of the side plates 16 on the outer side with guiding lugs 16ª above and below the bars 15, and to secure the said bars 15 to the adjacent plates 16 by means of a counter-sunk screw 18 engaging a nut 19 in a rectangular recess formed in the inner surface of each of the plates 16 to receive the same (see Figs. 5 and 6). I also provide means for supporting the demountable unit positively in the main frame 1, and in this instance, I have shown each of the side plates 16 provided with a boss or lug 20 having a threaded aperture therein provided with a vertically disposed adjusting screw 24, the lower end of which rests upon a lug 23 secured to and projecting through the inner face of the forwardly extending portion of the main frame. It will thus be seen that when the demountable unit is in its lowest position, it is supported by the main frame of the machine, just as if it were rigidly secured thereto, but in passing over roots, stones, or other obstacles, the operator by merely depressing the rear end of the handle or handle bars can raise the demountable unit without raising any other part of the machine. In so doing, he will press downward upon the handle bars with a pressure equal to and slightly greater than the weight of the demountable unit so that while the weight of the demountable unit is transferred from the forwardly extending part of the frame to the pivotal connections between the handle bars and the frame practically double the amount of weight is exerted at those points, and as the handle bars are pivoted forward of the axis of the ground engaging rollers 2, sufficient weight will always be maintained forward of the ground engaging rollers to prevent the machine tipping over backward, which might otherwise result, especially if the machine was moving uphill.

In order to make the action of the fan blades 61 effective the rotary sweeping or raking device is provided with an inclosing casing and in forming this casing, I prefer to provide the inner faces of the side plates 16 with parallel ribs 28 to receive and hold sheet metal casing sections 29 between them, the said ribs being so disposed that they form a partly cylindrical casing open at the bottom and a discharge chute 30 extending from the upper side of the casing forwardly therefrom, as clearly shown in Fig. 5. The rear casing plate 29 does not extend all the way to the bottom of the side plates for the reason that if it did, it might encounter an obstruction which would bend or injure its lower edge and the space between the lower edge of the rear plate 29 and the bottom of the side plates is filled by a movable plate 31 secured to a bar or swinging arm 32 pivotally mounted upon or coaxially with the shaft 21, as clearly shown in Fig. 5, stops being provided to limit the downward movement of said arms 32 and plate 31, in this instance said lugs 33 being provided on the inner faces of the side plates 16 in position to engage the arms 32. It will thus be seen that this movable plate 31 extends very close to the ground so as to assist in collecting the loose material gathered by the rotary device, while if it strikes an obstruction, it can yield upwardly and backwardly in the direction of the arrow $x$ in Fig. 5, so as to pass over the obstruction without injury to the casing, and to this end the forward edge of the plate 31 is preferably bent outwardly, rearwardly, and upwardly, as indicated at 31ª, to stiffen and strengthen the plate at that point.

When the device is used as a lawn rake or sweeper I preferably provide the machine with a detachable collecting box which can be removed therefrom when the machine is used for other purposes. This collecting box is supported by a metal frame having vertical standards 34 which are bolted to bracket arms 35, which are preferably detachably secured to the forwardly extending portion of the main frame just in rear of the pivotal connection, for the caster wheels and are provided with adjustable braces 34ª. The upper ends of the standards 34 are connected by a U-shaped frame 36 preferably formed integral with said standards and supporting the main casing of the collecting box, comprising the front wall 37 and bottom 38 which are formed of sheet metal, the said bottom having at its rear edge an inwardly extending portion 39 terminating in a lip which extends beneath the forward end of the chute 30. The collecting box is completed by two doors 71—71 which close the ends of the casing or box and are hinged at their upper ends so that they remain closed by gravity and I prefer to provide means for opening one or the other of the doors 71 to facilitate the discharge of the collected material. In this instance I have shown each door provided with a projecting lug 72 to which one end of a cord or other flexible connection 73 is connected, the flexible connections extending over pulleys 74 connected with the frame of the collecting box and running thence to the rear of the machine adjacent to the hand engaging portions, so that the operator by pulling on one or the other of said cords can raise either of the doors to horizontal position. To facilitate the discharge of the collected material, I provide the collecting box with a movable expelling plate 75 which can be moved from one end of the box to the other and which is normally retained at one end or the other so that it does not interfere with the collection of material within the box. In this instance, the expelling plate 75 is made of a shape conforming to the cross sectional area of the box and is provided with a supporting bracket 76 which slides upon a transversely disposed guide rod 77, the said bracket 76 being secured to a sprocket chain 78 passing over sprocket wheels 79, mounted on short shafts 80 in suitable bearings at opposite ends of the box. One of the said short shafts 80 is connected by a universal joint 81 with an actuating shaft 82 extending rearwardly to a point adjacent to the hand engaging portions 13, where it passes loosely through a pivotally supported sleeve or bearing 83 and is provided with a hand wheel 84 or crank by which it can be rotated. The hand wheel is placed at such a distance beyond the sleeve 83 that it will not interfere with the depression of the handles for the purpose of raising the demountable unit, as hereinbefore described, at which time the actuating shaft 82 merely moves longitudinally through the sleeve 83 to accommodate the movement of the handles.

While in Fig. 4 I have shown the expelling plate 75 in the center of the collecting box for clearance, it will normally be located at one side or the other of the box and after a sufficient quantity of the loose material has been collected in the box, the operator will raise the door at the opposite side of the box, and rotate the actuating shaft 82 so as to cause the expelling device to move toward the open door, thereby forcing the contents of the box out in a pile upon the ground, where it can be burned or otherwise disposed of. It will also be seen that when the machine is in operation, the loose material swept up or raked up by the sweeping or raking members will be carried rearwardly and upwardly by the same within the fan casing and also actuated upon by the current of air created by the fan blades, which current of air will be discharged from the discharge chute 30 of the fan casing with the collected material, and deposited in the collecting box.

It will be understood that the shaft 70 will be provided with a suitable clutch (not shown in detail herein) for connecting the sprocket wheel 7, to and disconnecting it from said shaft, which clutch may be conveniently actuated by means of a clutch lever 85 extending rearwardly to a point within convenient reach of the operator. The cross bar 12 is conveniently provided with supporting brackets 86 and 87 to guide the rear ends of the clutch and reversing levers 85 and 42 respectively, and said brackets are preferably notched at suitable intervals to retain the levers in adjusted position, as shown in detail in Fig. 10. The cross bar 12 is also preferably provided with means for securing the doors in elevated positions. In this instance I have shown the flexible connections 73 as extending through brackets 87 on the crossbar 12 beyond which they may be provided with handles and any desired means may be employed for securing the cords or connections 73 when the doors are opened. For example, the brackets 87 are shown as provided with key hole shaped openings and the cords are provided with knots or enlargements $73^a$ which will pass through the largest apertures of the openings so that the cords can be drawn rearwardly and retained by depressing them into the narrowest portions of the openings in the brackets 87. In order to facilitate the insertion and removal of any of the demountable units herein referred to, the side plates of the main frame are so constructed as to give access to the screws or bolts 18, which connect the demountable units with the arms 15 of the handles, and in this instance, the said side frames of the machine are provided with apertures 88 through which access may be had to the screw 18 to attach and detach the demountable unit to and from the bars 15. In Fig. 11 I have shown a demountable scarifying unit supported in a casing similar to the casing for the sweeping and raking unit and adapted to be secured to the arms 15 of the handle bars in exactly the same manner as the sweeping or raking unit heretofore described. The rotary member 90 of this scarifying unit is preferably provided with radially disposed spikes or teeth 91 for digging into the ground to a slight depth and scarifying, scratching, or indenting the earth adjacent to the roots of the grass so as to open it up and facilitate the application of grass seed, plant food, fertilizer, and the like. This device is preferably inclosed in the fan casing as shown, so that any dead grass or light particles thrown by the teeth will be delivered into the grass box, but if this is not desired, it may be used without the grass box and the casing plates may be omitted. The rotary member 90 may also be provided with two or more fan blades 92 of less depth than the lengths of the spikes or teeth where it is desired to deliver any particles thrown up by the teeth in the collecting box. The rotary scarifying member will be driven by the sprocket chain 27 in the same manner as the rotary raking or sweeping device. The side plates of the scarifying unit will be provided with adjusting screws $24^a$ to engage the lugs 23 of the main frame and regulate the height of the scarifier from the surface of the ground when the machine is in operation.

In Fig. 12 I have shown the machine provided with a demountable cutter unit 100 comprising a frame having side plates and suitable cross bars, and provided with a rotary cutter 101 and a stationary knife 102, and the rotary cutter or wiper has its shaft provided with a sprocket 26ᵇ adapted to be driven by the sprocket chain 27 in the same manner as the rotary members heretofore described, and the cutter unit is also provided with adjusting screws 24ᵇ to engage the lugs 23 on the main frame to regulate the height of the cutter unit when in normal position, and the demountable cutter unit is secured to the bars 15 by means of screws 18 in exactly the same manner as the other demountable units heretofore described. When the device is used as a lawn mower, simply the collecting box is preferably removed from the machine by loosening the bolts and other detachable connections which secure it to the main frame and the actuating shaft 82 is also preferably removed from the machine. This, however, is not essential, and the collecting box can be left on the machine while it is being used for all purposes, and whether the box is actually used or not.

From the foregoing description it will be seen that my improved machine is preferably equipped with a plurality of demountable units each of which is provided with parts to facilitate its connection with the forwardly extending arm 15 of the handle bars and with means for engaging portions of the main frame when in its lowest position to regulate its height above the ground, and each of the demountable units is provided with a rotary part having a sprocket wheel adapted to be driven by the chain 27 from the motor on the driving shaft, so that without any change whatever in the mechanism aside from the substitution of one of these demountable units for another, the machine may be used for cutting the lawn for raking and sweeping the lawn to remove cut grass, leaves, etc., or for scarifying the ground adjacent to the roots of the grass or bare ground, to facilitate the application of fertilizer, plant food, seed, and the like, thus producing a machine which is capable of use at all seasons of the year when it is possible to operate upon the sod at all without the necessity of having separate machines for these purposes.

What I claim and desire to secure by Letters Patent is:—

1. The combination with a main frame and rotary supporting devices therefor, of a rotary lawn raking and sweeping device carried by the main frame, and comprising a rotary part, a plurality of fan blades secured thereto and extending transversely of the main frame and a plurality of rows of raking and sweeping devices, each row being connected to said rotary device in rear of one of said fan blades and at points nearer to the access of said rotary part than the outer edge of the fan blade, said raking and sweeping devices having their outer ends extending beyond the outer edges of the fan blades, whereby said raking and sweeping devices are effectively protected from injury, and may be made of sufficient length to provide a high degree of resilience, and driving mechanism connected with the main frame and operatively connected with said rotary part.

2. The combination with a main frame and rotary supporting devices therefor, of a rotary lawn raking and sweeping device carried by said main frame, and comprising a rotary shaft extending transversely of the main frame, a plurality of transversely disposed bars operatively connected with said shaft and supported thereby, fan blades secured to said bars projecting outwardly therefrom, and extending transversely from one side of the machine to the other, and flexible lawn raking and sweeping members secured to said bars in rear of the fan blades and having their outer ends extending beyond the outer edges of said blades, whereby said raking and sweeping members will be protected by the fan blades throughout the entire width of the machine, and the raking and sweeping members may be made of sufficient length to provide a high degree of resilience, driving mechanism connected with the main frame and operatively connected with said rotary shaft.

3. The combination with a main frame provided with rotary supporting devices, of a rotary lawn raking and sweeping device carried by the main frame, comprising a rotary shaft, a plurality of substantially parallel bars, each of said bars being provided with transverse apertures, raking and sweeping members extending through said apertures of said bars, and provided at their inner ends with means for preventing them from being drawn out of the bars, retaining means secured to said bars and adapted to engage the inner ends of said raking and sweeping members to prevent their inward movement with respect to the bar by which they are carried, and fan blades secured to each of said bars and extending longitudinally of the bar from one end of the rotary device to the other and projecting outwardly therefrom, each blade lying in front of the bar and the portions of the raking and sweeping members connected therewith, said raking and sweeping members extending outwardly beyond the outer edge and substantially parallel to said blade, and an inclosing casing provided with a delivery chute.

4. The combination with a main frame provided with rotary supporting devices, of a rotary lawn raking and sweeping device carried by the main frame, comprising a rotary shaft, a plurality of substantially parallel bars carried thereby, and provided with transverse apertures, raking and sweeping members extending through said apertures and being provided at their inner ends with means for preventing them from being drawn outwardly with respect to said bars, a fan blade secured to each of said bars, and having a blade portion extending outwardly therefrom, and a retaining portion disposed angularly to the blade portion adapted to engage the inner ends of said raking and sweeping members, to prevent them from being moved inwardly with respect to said bars, and inclosing casing provided with a delivery chute.

5. The combination with a main frame provided with rotary supporting devices, of a rotary lawn raking and sweeping device carried by the main frame, comprising a rotary shaft, a plurality of substantially parallel bars carried thereby, each of said bars being provided with transverse radially disposed apertures, and with a longitudinal groove at its inner face, a plurality of raking and sweeping members engaging said apertures and having loop portions lying in said groove, a longitudinal securing rod lying in said groove and extending through the loop portions of said raking and sweeping members, a fan blade secured to each of said bars and having a blade portion extending outwardly therefrom substantially parallel to said raking and sweeping members, and an angular portion engaging the inner face of the bar over said groove to close the same and prevent the inward movement of the raking and sweeping members, and an inclosing casing provided with a delivery chute.

6. In a lawn treating machine, the combination with a main frame, rotary supporting devices therefor, and driving mechanism for a rotary lawn treating device, of a demountable lawn raking and sweeping unit comprising among its members a frame entirely separate from the main frame, a rotary part carried by said main frame and provided with lawn raking and sweeping members, and an inclosing casing secured to said separate frame independently of the main frame, and provided with a discharge chute, said main frame being provided with means for detachably supporting a demountable lawn treating unit, and detachable gear connections from said driving mechanism to said rotary part, whereby the entire demountable lawn raking and sweeping unit can be removed intact from the main frame to permit a lawn mowing or other lawn treating unit to be substituted therefor.

7. In a lawn treating machine, the combination with a main frame, rotary supporting devices therefor, and driving mechanism for a rotary lawn treating device, of a demountable lawn raking and sweeping unit comprising among its members a frame entirely separate from the main frame, a rotary part carried by said main frame and provided with lawn raking and sweeping members, and an inclosing casing secured to said separate frame independently of the main frame, and provided with a discharge chute, a collecting receptacle detachably secured to the main frame in operative relation with said discharge chute, said main frame being provided with means for detachably supporting a lawn treating unit, and detachable gear connections from the driving mechanism to said rotary part, whereby the entire demountable lawn raking and sweeping unit and the collecting receptacle can be removed intact from the main frame, to permit a lawn mowing or other lawn treating unit to be substituted therefor.

8. In a lawn treating machine, the combination with a main frame, rotary supporting devices therefor, and driving mechanism for a rotary lawn treating device, of a demountable lawn raking and sweeping unit comprising among its members a frame entirely separate from the main frame, a rotary part carried by said main frame and provided with lawn raking and sweeping members, and an inclosing casing secured to said separate frame independently of the main frame, and provided with a discharge chute, steering handles pivoted to the main frame, and provided with forwardly extending arms, means for detachably securing said demountable lawn raking and sweeping unit to said forwardly extending arms, and supporting devices on the main frame for engaging and supporting a demountable unit, whereby the depression of said handles will raise the demountable unit connected therewith vertically, and whereby the entire demountable lawn raking and sweeping unit can be removed intact from said forwardly extending arms to permit a lawn mowing or other lawn treating unit to be substituted therefor, detachable gear connections from said driving mechanism to the rotary part of the demountable unit secured to said arms, and a collecting receptacle detachably secured to the main frame in operative relation with said discharge chute.

9. The combination with a main frame, rotary supporting devices therefor, a demountable lawn raking and sweeping unit comprising among its members, a separate frame composed of side plates, provided with parallel ribs, means for connecting said side plates, casing members interposed between said side plates, and a rotary part carried said side plates within said casing members, and provided with raking and sweeping members, and fan blades, said main frame being provided with means for supporting said demountable unit and with driving mechanism for said rotary part.

10. The combination with a main frame, and rotary traction and supporting devices therefor, of a motor carried by the main frame, operative connections between the motor and said traction device for propelling the main frame over the ground, steering handles pivotally connected to the main frame and having hand engaging portions extending rearwardly therefrom, said handle bars being provided with portions extending forwardly from their pivotal connections, a lawn raking and sweeping unit comprising a separate frame connected to said forwardly extending portions of said handle bars, an inclosing casing provided with a delivery chute, a rotary lawn raking and sweeping device carried by said separate frame, and provided with a gear member, said main frame being provided with means for supporting said demountable unit when in its lowest position, and operative connections between said gear member of the rotary lawn raking and sweeping device and the motor.

11. The combination with a main frame and rotary ground engaging devices for supporting the same, a rotary lawn treating device carried by said main frame, an inclosing casing for said rotary device, and comprising a main body provided with a transversely extending portion curved vertically, and a vertically movable transversely disposed portion curved concentrically therewith and pivotally mounted concentrically thereto normally extending below the curved portion of the main body of the casing, and stops for sustaining the vertically movable portion in its lowest position and out of contact with the ground.

12. The combination with a main frame and rotary ground engaging devices therefor, of steering handles pivotally connected with the main frame, having rearwardly extending hand engaging portions and forwardly extending supporting portions, a separate frame secured to the forwardly extending portions of said handles, a rotary lawn treating device carried thereby, an inclosing casing for said rotary device carried by the forward extensions of the handles, said casing being open at the bottom, a vertically movable transversely disposed plate normally extending below a transversely disposed lower edge of said casing, and having a sliding engagement therewith and means for supporting said movable plate in its lowest position out of contact with the ground.

13. The combination with the main frame and rotary ground engaging devices for supporting the same, of a rotary lawn raking and sweeping device supported by said main frame, said main frame being provided with driving mechanism for said rotary device, an inclosing casing for said rotary device, provided with a delivery chute, a collecting box carried by the main frame, and supported in operative relation to the delivery chute, said collecting box being provided with a vertically disposed normally closed door at the end, an expelling device located in said box, means for moving said expelling device transversely of the box toward said door, and means for positively raising said door into open position.

14. The combination with the main frame and rotary ground engaging devices for supporting the same, of a rotary lawn raking and sweeping device stationarily supported by said main frame, said main frame being provided with driving mechanism for said rotary device, an inclosing casing for said rotary device provided with a delivery chute, a collecting box carried by the main frame, and supported in operative relation to the delivery chute, said collecting box being provided with a vertically disposed normally closed door at the end, an expelling device located in said box, means for moving said expelling device transversely of the box toward said door, and means for positively raising said door into and maintaining it in open position.

15. The combination with a main frame, rotary ground engaging supporting devices therefor, a rotary part supported by said main frame, an inclosing casing therefor provided with a delivery chute, a collecting box stationarily supported by the main frame in operative relation to the delivery chute, steering handles pivotally connected to said main frame, and provided with forwardly extending portions connected to said rotary device, for elevating the same, an ejector in said collecting box movable transversely therein, means for operating the same, and a manually operable actuating device for said ejector operating means having its forward end connected to said operating means for manually actuating the same and the ejector operatively, and having its rear end movably connected with said steering handles for supporting it adjacent to the operator without interfering with the depression of the handles.

16. The combination with a main frame, rotary ground engaging supporting devices therefor, a rotary part supported by said main frame, an inclosing casing therefor provided with a delivery chute, a collecting box stationarily supported by the main frame in operative relation to the delivery chute, steering handles pivotally connected to said main frame and provided with forwardly extending portions connected to said rotary devices for elevating the same, an ejector in said collecting box movable transversely therein, means for operating the same, and a manually operable actuating shaft having its forward end connected with said operating means for manually actuating said operating means and the ejector, and its rear end supported adjacent to the hand engaging portions of said steering handles by means movable longitudinally of said shaft, to permit the depression of said steering handles.

In testimony whereof I affix my signature, in the presence of two witnesses.

WILLIAM H. COLDWELL.

Witnesses:
 GRAHAM WITSCHIEF,
 ELIZABETH A. FLYNN.